United States Patent
Wang

(10) Patent No.: US 11,074,882 B2
(45) Date of Patent: Jul. 27, 2021

(54) METHOD AND DEVICE FOR ADJUSTING GRAYSCALE OF DISPLAY PANEL

(71) Applicants: HKC CORPORATION LIMITED, Guangdong (CN); CHONGQING HKC OPTOELECTRONICS TECHNOLOGY CO., LTD., Chongqing (CN)

(72) Inventor: Mingliang Wang, Chongqing (CN)

(73) Assignees: HKC CORPORATION LIMITED, Shenzhen (CN); CHONGQING HKC OPTOELECTRONICS TECHNOLOGY CO., LTD, Chongqing (CN)

( * ) Notice: Subject to any disclaimer, the term of this patent is extended or adjusted under 35 U.S.C. 154(b) by 0 days.

(21) Appl. No.: 16/625,360

(22) PCT Filed: Jun. 22, 2018

(86) PCT No.: PCT/CN2018/092366
§ 371 (c)(1),
(2) Date: Dec. 20, 2019

(87) PCT Pub. No.: WO2019/001353
PCT Pub. Date: Jan. 3, 2019

(65) Prior Publication Data
US 2020/0160801 A1    May 21, 2020

(30) Foreign Application Priority Data
Jun. 26, 2017    (CN) .......................... 201710497582.2

(51) Int. Cl.
*G09G 3/36*      (2006.01)
*G09G 3/28*      (2013.01)
(Continued)

(52) U.S. Cl.
CPC ........... *G09G 3/3648* (2013.01); *G09G 3/006* (2013.01); *G09G 3/2803* (2013.01); *G09G 3/36* (2013.01);
(Continued)

(58) Field of Classification Search
CPC ...... G09G 3/36; G09G 3/3607; G09G 3/3611; G09G 3/3648; G09G 5/10;
(Continued)

(56) References Cited

U.S. PATENT DOCUMENTS

| | | | |
|---|---|---|---|
| 10,832,625 B2 * | 11/2020 | Wang | G09G 3/006 |
| 2016/0225344 A1 | 8/2016 | Joo et al. | |
| 2019/0266968 A1 * | 8/2019 | Wang | G09G 3/006 |

FOREIGN PATENT DOCUMENTS

| | | |
|---|---|---|
| CN | 105185286 A | 12/2015 |
| CN | 106782283 A | 5/2017 |

(Continued)

OTHER PUBLICATIONS

International Search Report, dated Sep. 29, 2018, for HKC Corporation Limited et al., International Application No. PCT/CN2018/092366, Filed Jun. 22, 2018.

(Continued)

*Primary Examiner* — Vijay Shankar
(74) *Attorney, Agent, or Firm* — Law Offices of Albert Wai-Kit Chan, PLLC

(57) ABSTRACT

Disclosed are a method and a device for adjusting grayscale of display panel, the method includes: obtaining a current image by performing image acquisition of a display panel; identifying an nonuniform block in the current image, detecting original output brightness and original input grayscale of the nonuniform block; determining a target input grayscale corresponding to a preset target brightness according to an actual Gamma curve value, wherein the actual (Continued)

Gamma curve value is obtained by testing the display panel; taking a difference between the original input grayscale and the target input grayscale as a grayscale compensation value of the nonuniform block.

20 Claims, 9 Drawing Sheets

(51) Int. Cl.
*H04N 1/407* (2006.01)
*G09G 5/10* (2006.01)
*G09G 3/00* (2006.01)
*H04N 9/04* (2006.01)

(52) U.S. Cl.
CPC ......... *G09G 3/3607* (2013.01); *G09G 3/3611* (2013.01); *G09G 5/10* (2013.01); *H04N 1/4078* (2013.01); *H04N 9/04513* (2018.08); *G09G 2310/027* (2013.01); *G09G 2320/029* (2013.01); *G09G 2320/0233* (2013.01); *G09G 2320/0626* (2013.01); *G09G 2320/0673* (2013.01); *G09G 2330/12* (2013.01); *G09G 2360/16* (2013.01)

(58) Field of Classification Search
CPC ..... G09G 2310/027; G09G 2320/0626; G09G 2320/0276; G09G 2320/029; G09G 2320/0233; G09G 2320/0673; G09G 2330/12; G09G 2360/16; G09G 2360/145; G09G 3/006; G09G 3/2803
See application file for complete search history.

(56) References Cited

FOREIGN PATENT DOCUMENTS

CN 107045863 A 8/2017
CN 107065252 A 8/2017

OTHER PUBLICATIONS

Office Action, dated Oct. 16, 2017, for HKC Corporation Limited et al., Chinese Patent Application No. 201710497582.2, filed Jun. 26, 2017.

Written Opinion, dated Sep. 29, 2018, for HKC Corporation Limited et al., International Application No. PCT/CN2018/092366, Filed Jun. 22, 2018.

* cited by examiner

METHOD AND DEVICE FOR ADJUSTING GRAYSCALE OF DISPLAY PANEL

TECHNICAL FIELD

The present disclosure relates to the field of liquid crystal panel display, and more particularly relates to a method and a device for adjusting grayscale of display panel.

BACKGROUND

Due to the complicated manufacturing technique and high controlling difficulty, nonuniform phenomenon of displaying brightness (also called Mura phenomenon) is likely to occur on liquid crystal panel during the production process, in another word, it is a phenomenon that certain area of the panel presents block-shaped trace due to the difference of display brightness, thus reducing the quality level of the panel. In recent years, with the popularity of 2K television (TV) and 4K TV, the phenomenon of Mura is increasingly severe. To solve the Mura phenomenon, a technique of eliminating Mura (also called Demura technology) has emerged as the times require. The technique of eliminating Mura belongs to a kind of external compensation technology. Currently, this technology is mainly to illuminate the backplane, through a Charge-coupled Device (CCD) optical camera to extract the brightness signal, detect the Mura of the display image, and based on the central area of the panel, compare the difference between the brightness of the other areas of the panel and the center area, then calculate the display data to be compensated according to the standard Gamma 2.2 curve (2.2 is the Gamma value for most of displays), so that the brightness of the whole panel becomes uniform.

At present, the prior art for eliminating Mura has the advantages of simple structure and flexible mode, so it is widely used at the present stage. However, the premise of calculating the compensation data is that the panel has already a standard Gamma 2.2 curve, but the Gamma curve of each piece of the panel is impossible to be precisely controlled in actual production process, which causes the Mura grayscale compensation value to be inaccurate and prone to affect the final effect of Demura.

The above content is only used to assist in understanding the technical solutions of the present disclosure, and does not constitute an admission that the above is prior art.

SUMMARY

It is the primary purpose of the present application that providing a method and a device for adjusting grayscale of display panel, which aims to solve the problem that the final result of eliminating nonuniform area is not good due to the inaccurate compensation value of the Mura during the process of manufacturing the liquid crystal display panel.

To achieve the above object, the present disclosure provides a method for adjusting grayscale of display panel. The display panel is a liquid crystal display panel including a common electrode and a pixel electrode, and the method includes the following operations:

obtaining a current image by acquiring image from the display panel;

identifying a nonuniform block in the current image, and detecting original output brightness and original input grayscale of the nonuniform block;

determining a target input grayscale corresponding to a preset target brightness according to an actual Gamma curve value, wherein the actual Gamma curve value is obtained by testing the display panel;

taking a difference between the original input grayscale and the target input grayscale as a grayscale compensation value of the nonuniform block;

applying an initial common voltage to the common electrode, and acquiring a plurality of sampling grayscale voltages and a specific grayscale voltage in accordance with the actual Gamma curve;

adjusting the voltage applied to the common electrode, to acquire a common voltage at which a flicker value of a display screen is minimized when the specific grayscale voltage is applied to the pixel electrode, taking the common voltage as an actual common voltage; and respectively adjusting at least one of the acquired sampling grayscale voltages when the actual common voltage is applied to the common electrode, determining a flicker value of the corresponding display screen, and taking the grayscale voltage corresponding to the minimum flicker value of the display screen as the Gamma reference voltage corresponding to the grayscale.

Optionally, prior to the operation of determining a target input grayscale corresponding to a preset target brightness according to an actual Gamma curve value, the method further includes the following operations:

obtaining n reference images of the display panel at different input grayscales, wherein the n is an integer greater than or equal to 2;

calculating a reference Gamma curve value of each reference image; and taking an average value of the reference Gamma curve values as the actual Gamma curve value.

Optionally, the n is an integer greater than or equal to 5.

Optionally, the operation of calculating a reference Gamma curve value of each reference image specifically includes:

detecting a reference input grayscale and a reference output brightness of each reference image; and calculating a reference Gamma curve value of each reference image according to the reference input grayscale, the reference output brightness, and a Gamma mathematical model; the Gamma mathematical model characterizing a correspondence relationship between the reference input grayscale and the reference output brightness.

Optionally, the Gamma mathematical model is:

$$\frac{Tx - To}{T255 - To} = \left(\frac{Lx}{255}\right)^{Gamma}$$

Where Tx is the reference output brightness, T255 is the corresponding output brightness when the input grayscale is 255, To is the corresponding output brightness when the input grayscale is 0, Lx is the reference input grayscale, and Gamma is the actual Gamma curve value.

Optionally, prior to the operation of determining a target input grayscale corresponding to a preset target brightness according to an actual Gamma curve value, the method further includes the following operations:

obtaining an output brightness of center point of the current image; and taking the output brightness of center point of the current image as a preset target brightness.

Optionally, prior to the operation of determining a target input grayscale corresponding to a preset target brightness according to an actual Gamma curve value, the method further includes the following operations:

obtaining the output brightness of each pixel in areas other than the nonuniform block in the current image; and taking an average value of the acquired output brightness as the preset target brightness.

Optionally, subsequent to the operation of taking a difference between the original input grayscale and the target input grayscale as a grayscale compensation value of the nonuniform block, the method further includes:

transmitting the grayscale compensation value to the display panel, allowing the display panel to take the grayscale of adding the grayscale compensation value to the original input grayscale of the nonuniform block as a new input grayscale of the nonuniform block, to eliminate the nonuniform block in the current image.

Optionally, the method further includes that recording the grayscale compensation value into a memory to achieve a compensation effect for the current image.

Optionally, the liquid crystal display panel is applicable to a computer display screen, a television display screen, and a tablet computer display screen.

Optionally, the operation of applying an initial common voltage to the common electrode, and acquiring a plurality of sampling grayscale voltages and a specific grayscale voltage in accordance with the actual Gamma curve includes:

applying an initial common voltage to the common electrode, adjusting a voltage applied to the pixel electrode, and acquiring a first sampling grayscale voltage corresponding to a maximum brightness value of the display screen and a second sampling grayscale voltage corresponding to a minimum brightness value of the display screen;

obtaining a plurality of intermediate brightness value corresponding to a plurality of intermediate grayscales according to the maximum brightness value, the minimum brightness value, and the actual Gamma curve, wherein the intermediate grayscale is a grayscale between the maximum grayscale and the minimum grayscale; and adjusting the voltage applied to the pixel electrode to obtain a plurality of sampling grayscale voltages corresponding to the plurality of intermediate brightness values.

Optionally, the specific grayscale voltage is a sampling grayscale voltage corresponding to a grayscale between the maximum grayscale and the minimum grayscale, the grayscale is one of grayscales which are corresponding to the plurality of sampling grayscale voltages.

Optionally, the operation of respectively adjusting at least one sampling grayscale voltages of the acquired plurality of sampling grayscale voltages is:

adjusting all of the sampling grayscale voltages of the acquired plurality of sampling grayscale voltages respectively.

Optionally, the plurality of sampling grayscale voltages comprise eight sampling grayscale voltages, or nine sampling grayscale voltages, or eleven sampling grayscale voltages.

Optionally, in the case that the plurality of sampling grayscale voltages comprise eight sampling grayscale voltages, the grayscales corresponding to the eight sampling grayscale voltages are: grayscale 0, grayscale 1, grayscale 31, grayscale 63, grayscale 127, grayscale 191, grayscale 254, and grayscale 255.

Optionally, the flicker value measurement frequency is equal to the video frame rate of the display screen.

Optionally, subsequent to the operation of determining the Gamma reference voltage, the method further includes:

measuring the afterimage-degree of the liquid crystal display panel, by switching a black and white grid screen which have being displayed for a certain period to a grayscale display screen.

In addition, to achieve the above object, the present disclosure also provides a device for adjusting grayscale of display panel, wherein the display panel is a liquid crystal display panel including a common electrode and a pixel electrode, and the device includes:

an image acquiring module, being configured to obtain a current image by acquiring image from the display panel;

an identifying module, being configured to identify an nonuniform block in the current image, and detect original output brightness and original input grayscale of the nonuniform block;

an computing module, being configured to determine a target input grayscale corresponding to a preset target brightness according to an actual Gamma curve value, wherein the actual Gamma curve value is obtained by testing the display panel;

a first adjusting module, being configured to take a difference between the original input grayscale and the target input grayscale as a grayscale compensation value of the nonuniform block;

an acquiring module, being configured to acquire a plurality of sampling grayscale voltages and a specific grayscale voltage in accordance with the actual Gamma curve when applying an initial common voltage to the common electrode;

a second adjusting module, being configured to adjust the voltage applied to the common electrode, to acquire a common voltage by the acquiring module at which a flicker value of a display screen is minimized when the specific grayscale voltage is applied to the pixel electrode, and take the common voltage as an actual common voltage;

a detecting module, being configured to determine a flicker value; and a third adjusting module, being configured to respectively adjust at least one of the acquired sampling grayscale voltages when the actual common voltage is applied to the common electrode, and determine a flicker value by detecting module of the corresponding display screen and taking the grayscale voltage corresponding to the minimum flicker value of the display screen as the Gamma reference voltage corresponding to the grayscale.

Optionally, the image acquiring module is an optical CCD camera and the detecting module further comprises a linear camera.

In addition, to achieve the above object, the present disclosure also provides a display device, including a display panel and a device for adjusting grayscale of display panel as described above.

The method for adjusting grayscale of the display panel proposed by the present disclosure can compensate the grayscale value of the nonuniform area of the display panel according to the actual Gamma curve and the preset target brightness during the process of producing each liquid crystal panel, thereby achieving the most accurate compensation effect. In turn, accurately and effectively eliminates the nonuniformity in the display panel, thereby solving the problem that the final elimination result of nonuniform area is not good due to the inaccurate compensation value of the Mura during the process of manufacturing the liquid crystal display panel. At the same time, on the basis of ensuring the minimum flicker degree of the display screen corresponding to a specific grayscale voltage, at least one sampling grayscale voltage is asymmetrically adjusted to obtain a Gamma reference voltage corresponding to the minimum flicker value of the display screen, i.e., in the present disclosure, the flicker value of the display screen corresponding to a specific grayscale voltage and at least one Gamma reference voltage is minimized by actual adjustment, thereby reducing the probability that the display screen flickers when the liquid crystal display panel is displayed in full grayscale, and reducing the occurrence chance of afterimages.

BRIEF DESCRIPTION OF THE ACCOMPANYING DRAWINGS

Various implementations, functional features, and advantages of this disclosure will now be described in further detail in connection with some illustrative embodiments and the accompanying drawings.

DETAILED DESCRIPTION OF ILLUSTRATIVE EMBODIMENTS

It is understood that the specific embodiments described herein are merely illustrative of the disclosure and are not intended to limit the disclosure.

Figure 1:
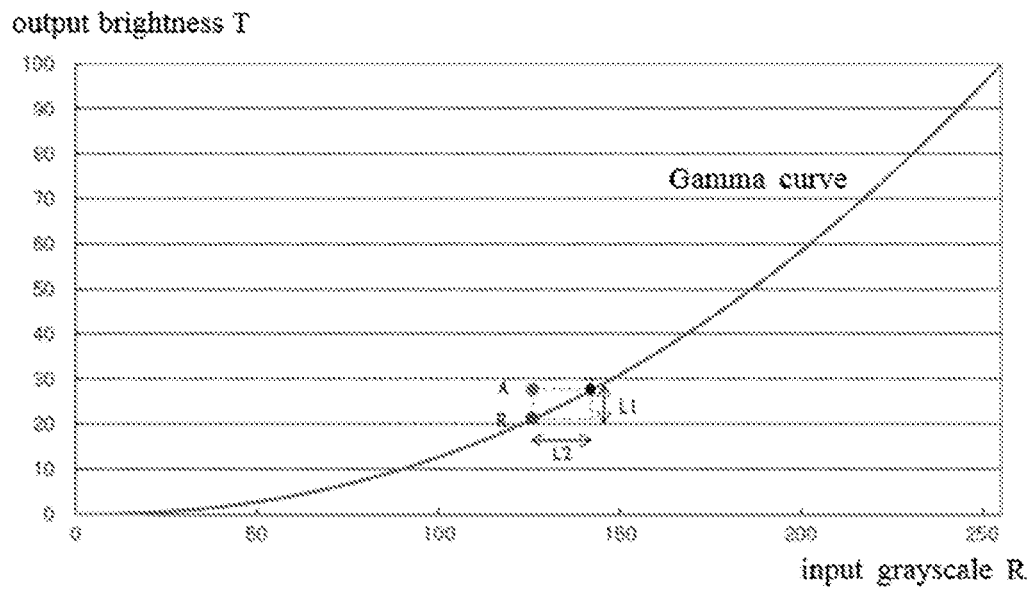
FIG. 1 is a schematic diagram of a conventional method of acquiring a panel grayscale compensation value.

At present, the prior art for eliminating Mura (also called as Demura) has the advantages of simple structure and flexible mode, so it is widely used at the present stage. However, the premise of calculating the compensation data is that the panel is already a standard Gamma 2.2 curve, but the Gamma curve of each piece of the panel is impossible to be precisely controlled in actual production process, which easily affects the final result of Demura. As shown in FIG. 1, it is the principle of calculating the compensation data of the commonly used Demura technology. As the Gamma curve shown in FIG. 1, the abscissa is the input grayscale R (that is the objective physical quantity of things), and the ordinate is the output brightness T (that is the subjective brightness perception). At the present stage, in order to facilitate the calculation, it is uniformly assumed that the Gamma curve is 2.2. The point A in the figure represents the target brightness, and the point R represents the actual brightness of the nonuniform area. So in order to increase the brightness of the nonuniform area to the target brightness of the display panel (that is the effect of obtaining a compensation brightness L1 as shown in the figure), it is necessary to obtain the compensation gray level L2 corresponding to the abscissa on the curve of Gamma 2.2. The shortcoming of this approach is that if the actual Gamma curve of the panel is not 2.2, then the compensation result will be biased, and even the Mura phenomenon will not be improved.

Figure 2:
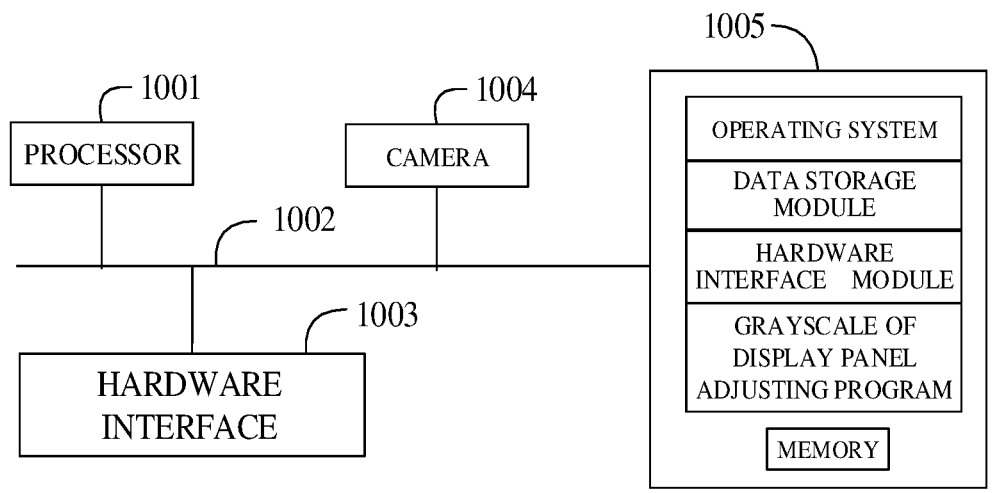
FIG. 2 is a schematic structural diagram of a grayscale adjusting device of a display panel in accordance with a hardware operating environment in accordance with embodiments of this disclosure.

According to FIG. 2, FIG. 2 is a schematic structural diagram of a grayscale adjusting device of a display panel in accordance with a hardware operating environment in accordance with embodiments of this disclosure.

As shown in FIG. 2, the device can include a processor 1001, such as a CPU, a communication bus 1002, a hardware interface 1003, a camera 1004, and a memory 1005. Among them, the communication bus 1002 is used to implement connection communication between these components. The hardware interface 1003 may include a liquid crystal display panel. The camera 1004 can optionally be a camera of a high-precision, high-resolution optical CCD camera that can achieve the resolution of the human eye. The memory 1005 may be a high speed RAM memory or a non-volatile memory, and may also include an Electrically Erasable Programmable Read-Only Memory (EEPROM).

It will be understood by those skilled in the art that the device structure illustrated in FIG. 2 does not constitute a limitation to the device, it may include more or less components than those illustrated, or some components may be combined, or different component arrangements.

As shown in FIG. 2, the memory 1005 as a computer storage medium may include an operating system, a data storage module, a hardware interface module, and a grayscale of the display panel adjusting program.

In the device shown in FIG. 2, the camera 1004 is configured to perform image collection on the display panel, the display panel is a liquid crystal display panel including a common electrode and a pixel electrode; the hardware interface 1003 is mainly used for data interaction with the display panel; the processor 1001 and the memory 1005 in the disclosed may be disposed in the device. The device calls the program for adjusting grayscale of the display panel stored in the memory 1005 by the processor 1001, and performs the following operations:

obtaining a current image by performing image acquisition of a display panel;

identifying a nonuniform block in the current image, detecting original output brightness and original input grayscale of the nonuniform block;

determining a target input grayscale corresponding to a preset target brightness according to an actual Gamma curve value, wherein the actual Gamma curve value is obtained by testing the display panel;

taking a difference between the original input grayscale and the target input grayscale as a grayscale compensation value of the nonuniform block;

applying an initial common voltage to the common electrode, and acquiring a plurality of sampling grayscale voltages and a specific grayscale voltage in accordance with the actual Gamma curve;

adjusting the voltage applied to the common electrode, to determine a common voltage at which a flicker value of a display screen is minimized when the specific grayscale voltage is applied to the pixel electrode, taking the common voltage as an actual common voltage; and respectively adjusting at least one of the acquired sampling grayscale voltages when the actual common voltage is applied to the common electrode, determining a flicker value of the corresponding display screen, and taking the grayscale voltage corresponding to the minimum flicker value of the display screen as the Gamma reference voltage corresponding to the grayscale.

Further, the processor 1001 calls the program for adjusting grayscale of the display panel stored in the memory 1005, and performs the following operations:

obtaining n reference images of the display panel at different input grayscales, wherein the n is an integer greater than or equal to 2;

calculating a reference Gamma curve value of each reference image; and taking the average value of the reference Gamma curve values as the actual Gamma curve value.

Further, the processor 1001 calls the program for adjusting grayscale of the display panel stored in the memory 1005, and performs the following operations:

detecting a reference input grayscale and a reference output brightness of each reference image; and calculating a reference Gamma curve value of each reference image according to the reference input grayscale, the reference output brightness, and a Gamma mathematical model; wherein the Gamma mathematical model characterizing a correspondence relationship between the reference input grayscale and the reference output brightness.

Further, the processor 1001 calls the program for adjusting grayscale of the display panel stored in the memory 1005, and performs the following operations:

obtaining an output brightness of center point of the current image, taking the output brightness of center point of the current image as a preset target brightness.

Further, the processor 1001 calls the program for adjusting grayscale of the display panel stored in the memory 1005, and performs the following operations:

obtaining the output brightness of each pixel in areas other than the nonuniform block in the current image; and taking the average value of the acquired output brightness as the preset target brightness.

Further, the processor 1001 calls the program for adjusting grayscale of the display panel stored in the memory 1005, and performs the following operations:

transmitting the grayscale compensation value to the display panel, for the display panel adding the grayscale compensation value to the original input grayscale of the nonuniform block as a new input grayscale of the nonuniform block, to eliminate the nonuniform block in the current image.

Further, the processor 1001 calls the program for adjusting grayscale of the display panel stored in the memory 1005, and performs the following operations:

applying an initial common voltage to the common electrode, adjusting a voltage applied to the pixel electrode, acquiring a first sampling grayscale voltage corresponding to a maximum brightness value of the display screen and a second sampling grayscale voltage corresponding to a minimum brightness value of the display screen;

obtaining an intermediate brightness value corresponding to a plurality of intermediate grayscales according to the maximum brightness value, the minimum brightness value, and the actual Gamma curve, wherein the intermediate grayscale is a grayscale between the maximum grayscale and the minimum grayscale; and adjusting the voltage applied to the pixel electrode to obtain sampling grayscale voltages corresponding to a plurality of intermediate brightness value.

Further, the processor 1001 calls the program for adjusting grayscale of the display panel stored in the memory 1005, and performs the following operations:

measuring the afterimage-degree of the liquid crystal display panel by displaying a black and white grid screen for a certain period and switching the screen to a grayscale display screen.

In an embodiment of the present disclosure, image acquisition is performed on a display panel to obtain a current image; a nonuniform block in the current image is identified, and an original output brightness of the nonuniform block and an original input gray level are detected; according to an actual Gamma curve value determines a target input grayscale corresponding to a preset target brightness, the actual Gamma curve value being obtained by testing the display panel; and a difference between the original input gray level and the target input gray level a value as a grayscale compensation value of the uneven block; applying an initial common voltage to the common electrode, and acquiring a plurality of sampling grayscale voltages and a specific grayscale voltage according to the actual Gamma curve; adjusting application a voltage on the common electrode to determine a common voltage at which a flicker value of the display screen is minimized when the specific grayscale voltage is applied to the pixel electrode, the common voltage being an actual common voltage; adjusting at least one of the acquired plurality of sampling grayscale voltages respectively, in a case where the actual common voltage is applied to the common electrode, measuring the flicker value of the corresponding display screen, and using the grayscale voltage corresponding to the minimum flicker value of the display screen as the Gamma reference voltage corresponding to the grayscale. The problem that unsatisfied result of Demura technology caused by inaccurate grayscale compensation value of the nonuniform area of the display panel during the process of producing each liquid crystal panel can be solved by the technical solution of the embodiment of the present disclosure. At the same time, on the basis of ensuring the minimum flicker degree of the display screen corresponding to a specific grayscale voltage, at least one sampling grayscale voltage is asymmetrically adjusted to obtain a Gamma reference voltage corresponding to the minimum flicker value of the display screen, i.e., in the present disclosure, the flicker value of the display screen corresponding to a specific grayscale voltage and at least one Gamma reference voltage is minimized by actual adjustment, thereby reducing the probability that the display screen flickers when the liquid crystal display panel is displayed in full grayscale, and reducing the occurrence chance of afterimages.

Based on the above hardware structure, an embodiment of a method for adjusting grayscale of display panel in accordance with this disclosure is proposed.

Figure 3:
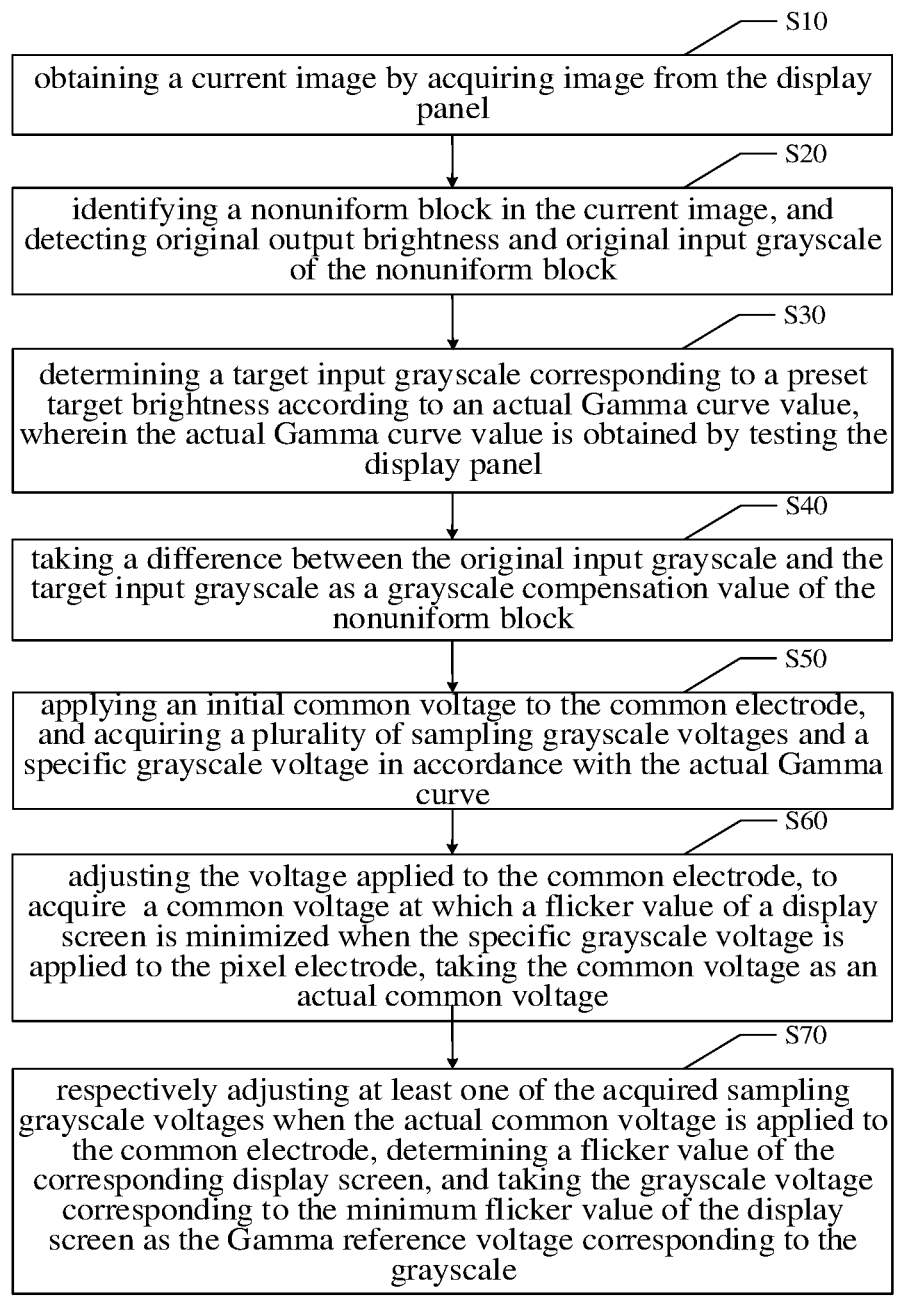
FIG. 3 is an illustrative flowchart of the first embodiment of a method for adjusting grayscale of display panel in accordance with this disclosure.

As shown in FIG. 3, FIG. 3 is an illustrative flowchart of the first embodiment of a method for adjusting grayscale of display panel in accordance with this disclosure, and the display panel is a liquid crystal display panel including a common electrode and a pixel electrode.

In this embodiment, the method includes the following operations S10 to S70.

In S10, obtaining a current image by performing image acquisition of a display panel.

It can be understood that the current image is the current display image of the display panel.

In a specific implementation, after the display panel is illuminated, the current display image (i.e., the current image) can be captured by the optical CCD camera.

It should be noted that the display panel in this embodiment is applicable to a computer display screen, a television display screen, and a tablet display screen.

In S20, identifying a nonuniform block in the current image, detecting original output brightness and original input grayscale of the nonuniform block.

It can be understood that Mura may occur in the current display image displayed by the display panel during the process of producing the display panel (that is, there may be nonuniform blocks appearing). While the image is being collected on the display panel, extracting the luminance signal of the nonuniform blocks of the current image.

It should also be noted that the brightness signal includes an input gray level and an output brightness. The input grayscale can be recognized by the display, and the grayscale represents an actual objective brightness, that is, an objective natural physical quantity, and the display will continuously acquire different input voltages (also called Gamma voltages). The different input voltages reflects different grayscales. And the output brightness is subjective brightness perception of the human eye. Since the perception of human to stimuli is nonlinear, the outside world strengthens the stimuli in a certain proportion. For people, this stimuli is evenly increased. Similarly, the human eye is also nonlinear in perception of natural brightness. So the subjective brightness of the eye perception is not exactly the same as the actual objective brightness. The Gamma curve is used to coordinate the relationship between the subjective brightness perception of the human eye and the actual objective natural brightness, i.e., to coordinate the output brightness and input grayscale. The mapping relationship between the above two can be determined by the formula: output value=(input value)$^{Gamma}$ reaction.

It can be understood that the output brightness value of the initial display picture (i.e., the subjective brightness perception of the human eye) is known; the grayscale value of the initially displayed picture (i.e., the input grayscale) is also known, but the display screen is displayed nonuniform under this grayscale. That is, there is Mura occurs. When detecting the nonuniform block, some Mura is obvious, the human eye can see, some Mura is not visible to the human eye. The professional device detects and recognizes the nonuniform blocks in the current image, that is, the pixel distribution feature is analyzed according to the display data in the collected current image, and the Mura is identified according to the relevant algorithm. There are many related algorithms in the process of detecting Mura, so the embodiment is not limited herein.

In S30, determining a target input grayscale corresponding to a preset target brightness according to an actual Gamma curve value, wherein the actual Gamma curve value is obtained by testing the display panel.

It should be noted that, in this embodiment, there is a uniform brightness display area in the current image, and the output brightness value of the display area is used as the preset target brightness value.

In the specific implementation, an output brightness of center point of the current image is obtained. The output brightness of center point of the current image is taken as a preset target brightness. That is, the output brightness of the central area of the panel of the current image is obtained and used as a baseline, and the difference between the brightness of the other areas of the panel and the central area is compared. Usually, in the actual production of the display panel, the center point of the display panel is the best place for optical taste. Therefore, when debugging the panel, the center point of the panel is used as the reference.

Optionally, the output brightness of each pixels in other areas than the nonuniform area in the current image is obtained, and an average value of the output brightness of the pixels is calculated, and the average value is used as a preset target brightness.

In S40, taking a difference between the original input grayscale and the target input grayscale as a grayscale compensation value of the nonuniform block.

Figure 4:
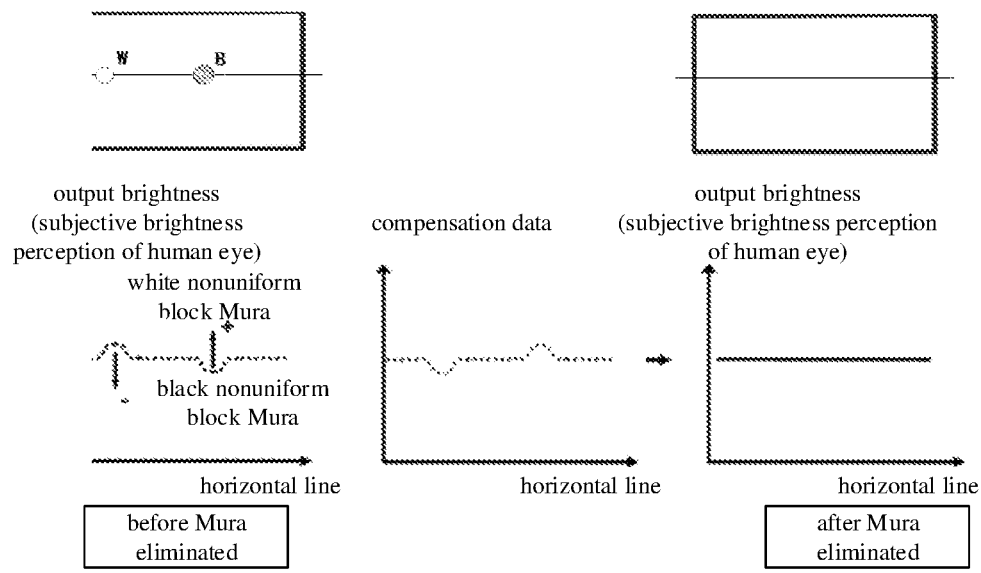
FIG. 4 is a principle schematic diagram of eliminating a nonuniform area of a display panel in accordance with embodiments of this disclosure.

It can be understood that, referring to FIG. 4, it is assumed that the picture on the left side has a white nonuniform block W and a black nonuniform block B in the horizontal direction. By performing the steps in S40, the difference between original (input) grayscale value and the target grayscale is used as the compensation data of the black nonuniform block (i.e., the grayscale compensation value), and data compensation is performed on the two regions. That is, the display data of the block is the sum of the original display data and the compensation data. The compensation data of the white nonuniform block is negative, that is, the display data will be reduced; and the display data corresponding to the black nonuniform block will be increased accordingly. So that uniform brightness can be obtained finally, and Mura can be eliminated.

Figure 5:
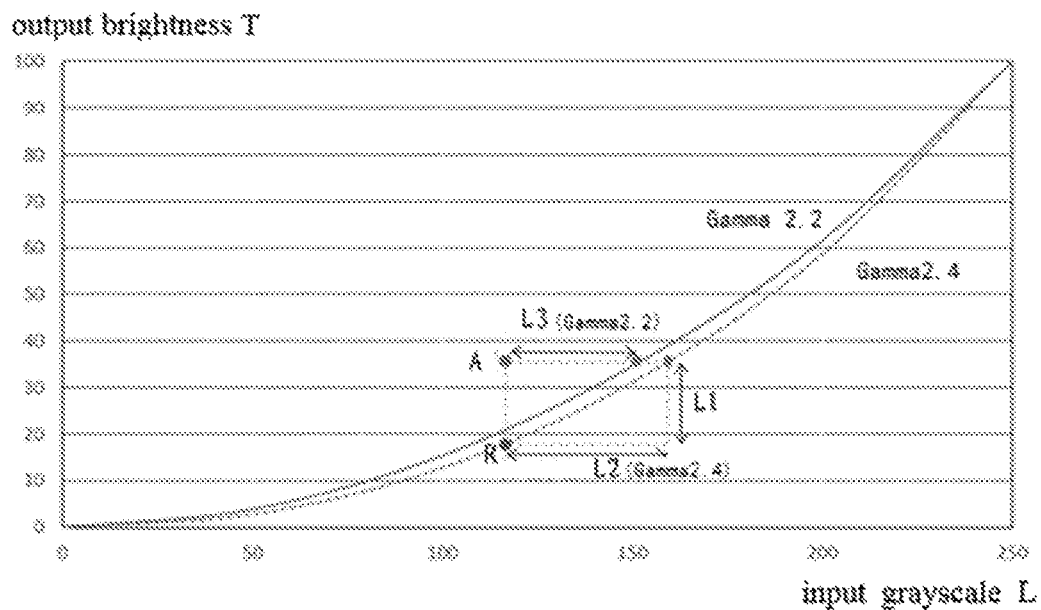
FIG. 5 is a principle schematic diagram of performing data compensation on a nonuniform area of a display panel in accordance with embodiments of this disclosure.

In the specific implementation, referring to FIG. 5, it is assumed that the measured actual Gamma curve value of panel is 2.4, the dotted line is the Gamma 2.4 curve, and the solid line is the Gamma 2.2 curve. It can be seen that when the same luminance difference L1 is compensated, the compensated grayscale value L3 obtained for the Gamma 2.2 curve is different from the compensated grayscale value L2 obtained under the Gamma 2.4 curve. That is, the compensated grayscale values obtained by different Gamma curves are different. The compensated grayscale value L3 of Gamma 2.2 curve is smaller than the compensated grayscale value L2 of the actual Gamma 2.4 curve. So only compensation that meets the characteristics of the panel itself is optimal.

After the step S40, the obtained grayscale compensation value may be burned into an Electrically Erasable Programmable Read Only Memory (EEPROM) to achieve a compensation effect of the current image. That is, transmitting the grayscale compensation value to the display panel, for the display panel adding the grayscale compensation value to the original input grayscale of the nonuniform block as a new input grayscale of the nonuniform block, to eliminate the nonuniform block in the current image.

In the process of manufacturing each liquid crystal panel, the grayscale value compensation is performed on the non-uniform block of the display panel according to the actual Gamma curve and the preset target brightness, thereby achieving the most accurate compensation result, and the Mura in display panel is eliminated accurately and effectively.

In S50, applying an initial common voltage to the common electrode, and acquiring a plurality of sampling grayscale voltages and a specific grayscale voltage in accordance with the actual Gamma curve.

It should be noted that the specific grayscale voltage may be one sampling voltage of the plurality of sampling grayscale voltages, or may not be, which is not limited in the disclosure. It depends on actual conditions. In addition, for the actual selection of the plurality of sampling grayscale voltages, those skilled in the art should understand that for the display screen of full grayscale (for example, 0 to 255 grayscale), when the adjusted values of the pixel voltage is same, the actual brightness value of the display screen for the lighter brightness area and the darker brightness area is smaller with respect to the actual brightness value of the intermediate brightness area of the display screen. Therefore, in order to ensure the accurate display brightness in lighter brightness area and the darker brightness area of the liquid crystal display panel, generally selecting the greater sampling grayscale voltage density in the lighter brightness area and the darker brightness area than the intermediate brightness area.

In S60, adjusting the voltage applied to the common electrode (For example, in FIG. 10, the common voltage is adjusted from the broken line V' to the solid line V.), to determine a common voltage at which a flicker value of a display screen is minimized when the specific grayscale voltage is applied to the pixel electrode, taking the common voltage as an actual common voltage.

In this case, when the specific grayscale voltage is one of the plurality of sampling grayscale voltages, the adjusted grayscale voltage applied to the pixel electrode serves as a Gamma reference voltage corresponding to the grayscale.

Figure 11:
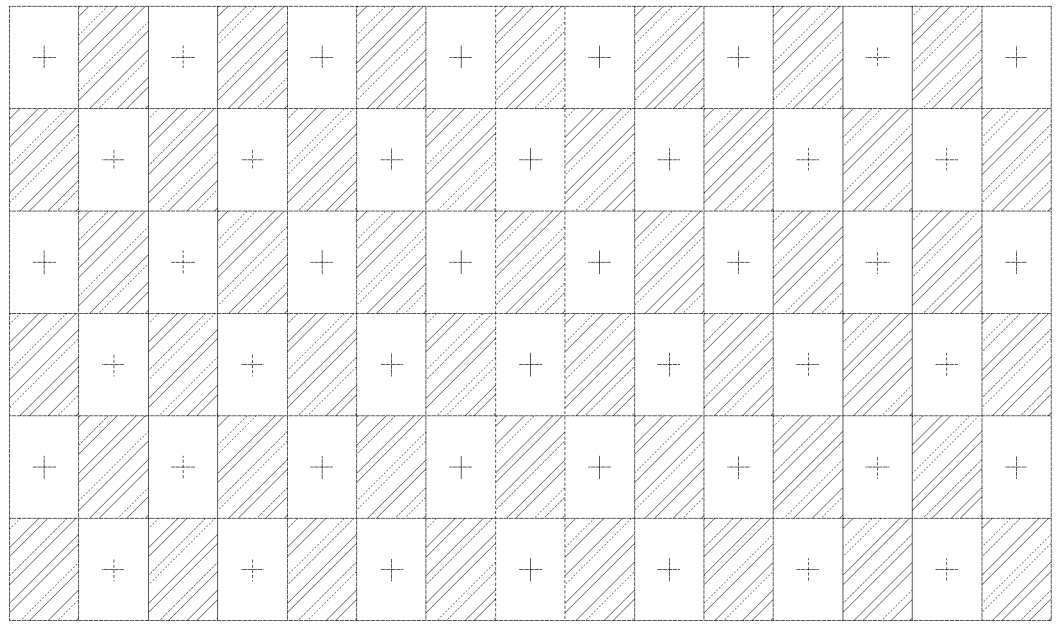
FIG. 11 is a schematic diagram of a frame flip display screen in accordance with embodiments of this disclosure.
Figure 12:
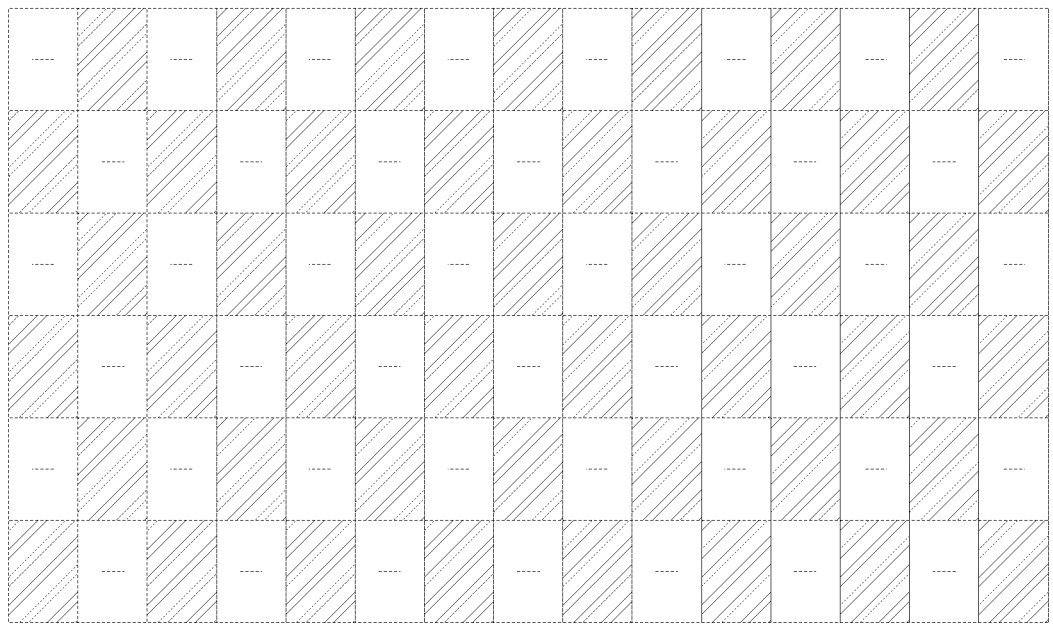
FIG. 12 is another schematic diagram of a frame flip display screen in accordance with embodiments of this disclosure.

It is to be noted here that the flicker value of the acquired display screen is the flicker value of the display screen corresponding to the grayscale voltage obtained by calculating the brightness difference of the display screen before and after the electric field polarity of the liquid crystal display panel is inverted. For example, taking the polarity inversion mode of the frame flip as an example. FIG. 11 represents a display screen of the liquid crystal display panel before the electric field polarity is reversed (corresponding to the positive grayscale voltage), and the brightness value of the display screen is L1. FIG. 12 represents the display screen of the liquid crystal display panel after the electric field polarity is reversed (corresponding to the negative grayscale voltage), the brightness value of the display screen is L2. In this case, according to the absolute difference of the brightness value L1 and L2 of the display screen before and after the electric field polarity is reversed. The absolute value and the ratio of the brightness value L1 of the display screen before the inversion can obtain the picture flicker value F, that is, $F=|L1-L2|/L1$. In this embodiment, the frame flipping is taken as an example, and of course, the dot flip, the row flip, or the column flip also can be used. The present disclosure does not limit this.

In addition, it should be noted that the screen flicker value F can be obtained as the ratio of the absolute value of the difference between L1 and L2 to the brightness value L1. L1 is the brightness value of the display screen before the flipping and L2 is the brightness value of the display screen after the flipping. The display screen before flipping and the display screen after flipping may be adjacent two frames of images that have undergone one polarity inversion (for example, the first frame display screen and the second frame display screen), or may be a multi-frame screen after a plurality of polarity inversions (for example, a first frame display screen and a fourth frame display screen). The specific measurement process needs to be determined according to the accuracy range of the measurement frequency of the device for measuring the brightness value. On the basis of the accuracy range of the measurement frequency, the brightness value measurement frequency is equal to the picture frame frequency of the display screen. That is, the flicker value measurement frequency is equal to the video frame rate of the display screen to obtain an accurate flicker value as much as possible. Of course, the finally obtained flicker value can be an average of the measured multiple flicker values.

In S70, respectively adjusting at least one of the acquired sampling grayscale voltages when the actual common voltage is applied to the common electrode, determining a flicker value of the corresponding display screen, and taking the grayscale voltage corresponding to the minimum flicker value of the display screen as the Gamma reference voltage corresponding to the grayscale.

It should be noted that, in the case that the specific grayscale voltage belongs to one of the plurality of sampling grayscale voltages in step S50, the at least one sampling grayscale voltage in the obtained plurality of sampling grayscale voltages is a sampling grayscale voltage other than the specific grayscale voltage.

In this step, for the determination of the flicker value, it is optional the frequency of the flicker value is equal to the frame rate of the picture on the display screen. The specific reason is the same as the foregoing, and details are not described herein again.

It should be noted that after the flicker debugging method, the obtained actual common voltage and the Gamma reference voltage are generally stored in the programmable chip, so that the display panel can perform full grayscale display normally.

Figure 9:
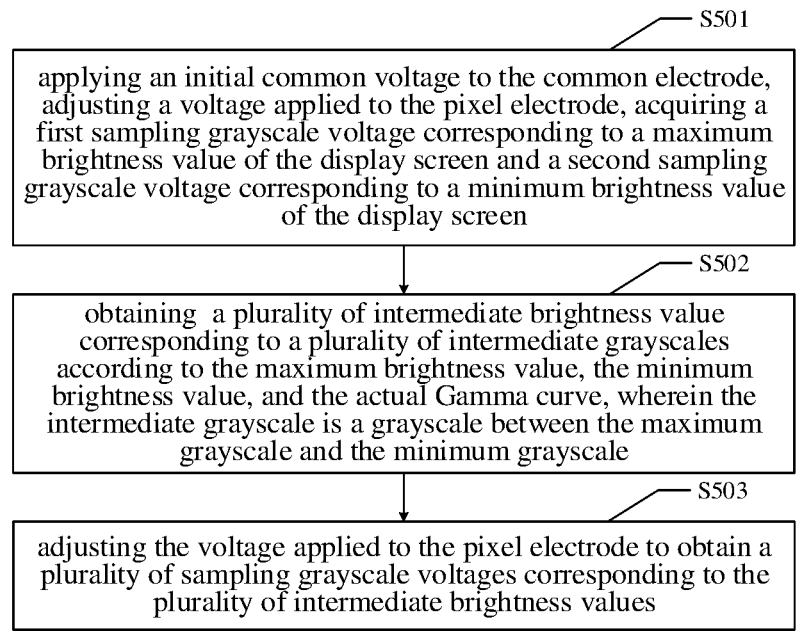
FIG. 9 is an illustrative flowchart of a method for adjusting grayscale of display panel in accordance with this disclosure.

The foregoing step S50 is further described below. Specifically, as shown in FIG. 9, the step S50 includes S501 to S503.

In S501, applying an initial common voltage to the common electrode, adjusting a voltage applied to the pixel electrode, acquiring a first sampling grayscale voltage corresponding to a maximum brightness value of the display screen and a second sampling grayscale voltage corresponding to a minimum brightness value of the display screen.

It should be noted that the first sampling grayscale voltage corresponds to a maximum grayscale, and the second sampling grayscale voltage corresponds to a minimum grayscale.

In S502, obtaining an intermediate brightness value corresponding to a plurality of intermediate grayscales according to the maximum brightness value, the minimum brightness value, and the actual Gamma curve, wherein the intermediate grayscale is a grayscale between the maximum grayscale and the minimum grayscale.

Specifically, the plurality of sampling grayscale voltages may be 8 sampling grayscale voltages, or 9 sampling grayscale voltages, or 11 sampling grayscale voltages, which are not limited in the disclosure. The intermediate brightness value is a brightness value corresponding to a grayscale other than the maximum grayscale and the minimum grayscale among all the grayscale voltages.

The present disclosure optionally obtains 8 sampling grayscale voltages, that is, acquires 8 Gamma reference voltages, and the specific grayscale voltage belongs to one of the sampling grayscale voltages. In this case, it is further optional in the present disclosure that the grayscales corresponding to the eight sampling grayscale voltages are: 0 grayscale, 1 grayscale, 31 grayscale, 63 grayscale, 127 grayscale, 191 grayscale, 254 grayscale, 255 grayscale.

In S503, adjusting the voltage applied to the pixel electrode to obtain sampling grayscale voltages corresponding to a plurality of intermediate brightness value.

Specifically, according to the intermediate brightness value corresponding to the intermediate grayscale obtained in step S502, adjusting the voltage applied to the pixel electrode to obtain sampling grayscale voltages corresponding to a plurality of intermediate brightness value.

On this basis, in step S60, it is necessary to select one of the plurality of sampled grayscale voltages acquired in step S50 as a specific grayscale voltage, and apply the specific grayscale voltage to the pixel electrode, and the adjustment is applied to the voltage on the common electrode to obtain the actual common voltage. Based on this, if the specific grayscale voltage is the grayscale voltage corresponding to the maximum grayscale or minimum grayscale of the plurality of grayscale voltages, the deviation of the actual common voltage is easily caused, and the probability of the screen flickering is large. Therefore, the specific grayscale voltage is a sampling grayscale voltage corresponding to a grayscale between the maximum grayscale and the minimum grayscale in the grayscales corresponding to the plurality of sampling grayscale voltages acquired in step S50, for example, the specific grayscale voltage may be 127 grayscale, of course, also can be 63 grayscale, depending on the actual application of the display panel, for example, can be selected within the display brightness range of most of the actual display of the display panel, and the present disclosure does not limit this.

Further, in step S70 of this disclosure, the operation of respectively adjusting at least one of the acquired sampling grayscale voltages is to adjust all of grayscales of the acquired sampling grayscale voltages respectively. Of course, when the specific grayscale voltage belongs to one of the plurality of sampling grayscale voltages, the flicker value of the display screen corresponding to the specific grayscale voltage has been adjusted to the minimum in step S60, and the corresponding grayscale is obtained. The voltage does not need to be adjusted repeatedly. In this case, the sampling grayscale voltage of the plurality of sampling grayscale voltages other than the specific grayscale voltage can be adjusted.

Figure 10:
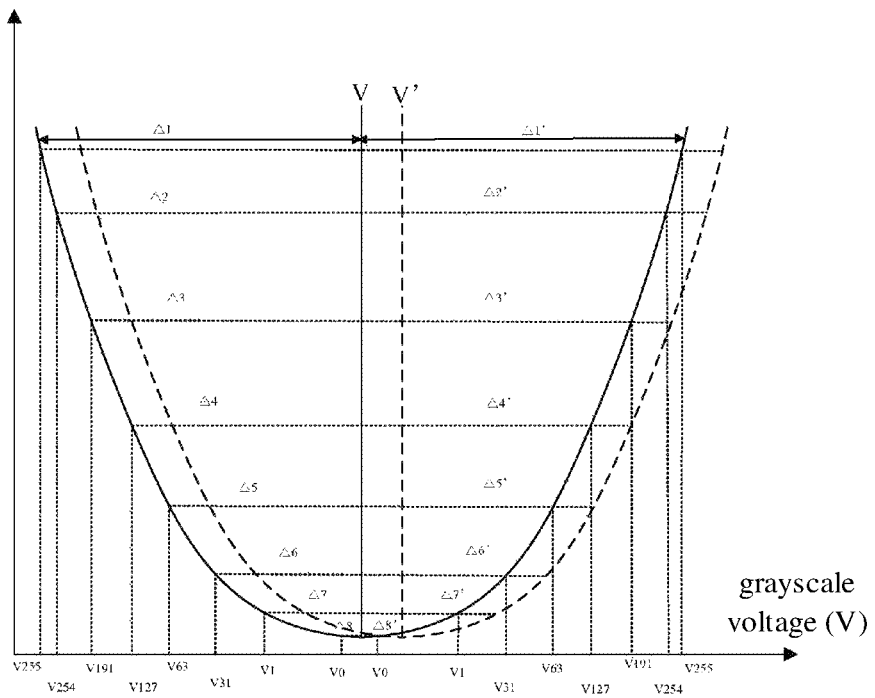
FIG. 10 is a schematic diagram of adjusting a sampling grayscale voltage in accordance with embodiments of this disclosure.

Specifically, for example, when the specific grayscale voltage corresponds to 127 grayscale, as shown in FIG. 10, different brightness respectively correspond to different grayscales, and in this case, respectively adjust positive polarity and negative polarity sampling grayscale voltage of 7 sampling grayscale voltages corresponds to 0 grayscale, 1 grayscale, 31 grayscale, 63 grayscale, 191 grayscale, 254 grayscale, 255 grayscale (located on the actual Gamma curve shown by the dotted line in FIG. 4). The sampling grayscale voltage is adjusted separately to obtain the positive grayscale voltage and the negative grayscale voltage of the grayscales corresponding to the minimum flicker value of the display screen. (V0, V1, V31, V63, V191, V254, V255). For example, for the sampling grayscale voltage corresponding to the 255 grayscale, as shown in FIG. 10, the positive polarity sampling grayscale voltage and the negative polarity sampling grayscale voltage corresponding to the sampling grayscale voltage are respectively adjusted to $\Delta 1'$ and $\Delta 1$ (based on the actual common voltage), the positive polarity grayscale voltage and the negative polarity grayscale voltage of the grayscale voltage V255 corresponding to the minimum flicker value corresponding to the display screen corresponding to the 255 grayscale are obtained (located on the actual Gamma curve shown by the solid line in FIG. 4). In this way, the actual adjustment setting can minimize the flicker value of the display screen corresponding to all the Gamma reference voltages, thereby minimizing the probability that the display screen flickers when the liquid crystal display panel is displayed in full grayscale.

Figure 13:
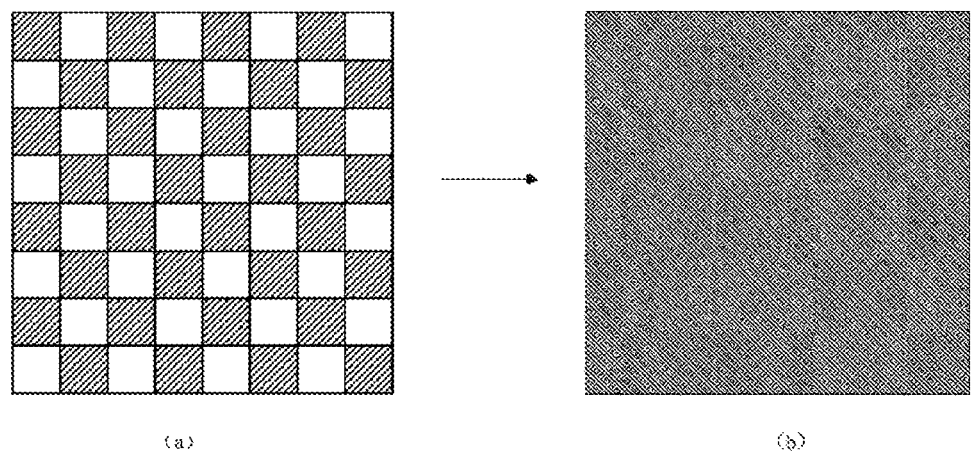
FIG. 13 is a schematic diagram of observing the degree of afterimage in accordance with embodiments of this disclosure.

Of course, based on the method of the present disclosure, after all the Gamma reference voltages are obtained, the degree of afterimage of the display screen can be further measured and verified. Specifically, as shown in FIG. 13, it is possible to determine the degree of afterimage of the liquid crystal display panel by displaying a black and white grid screen (In (a) of FIG. 13, the shaded square represents a black square, and the unshaded square represents a white square) for a certain period of time (may be 1 hour), then switching to a grayscale display screen ((b) in FIG. 13).

Figure 6:
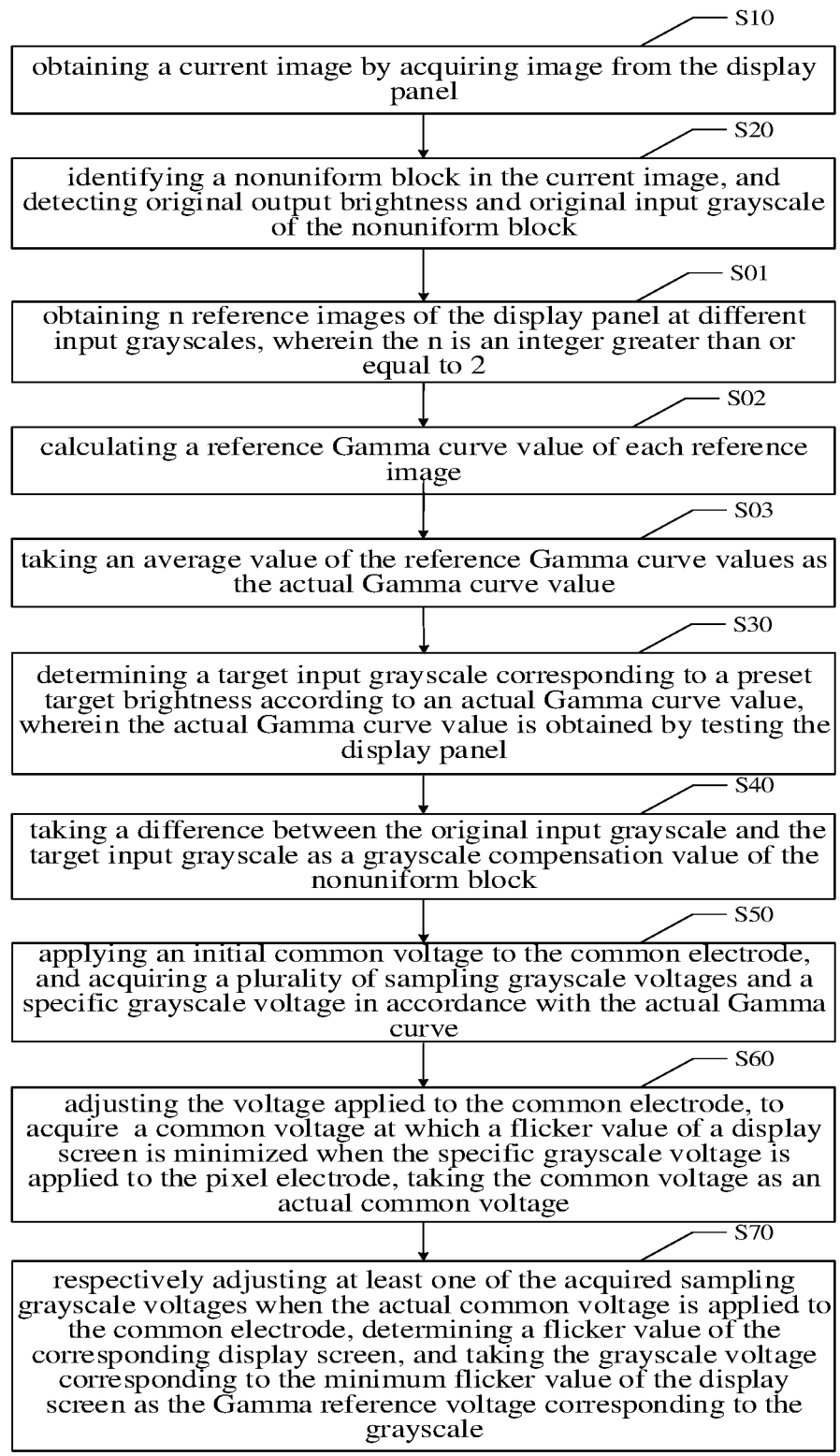
FIG. 6 is an illustrative flowchart of the second embodiment of a method for adjusting grayscale of display panel in accordance with this disclosure.

Referring to FIG. 6, a second embodiment of a method for adjusting grayscale of display panel is provided. Based on the first embodiment of the method above, FIG. 6 is based on the embodiment shown in FIG. 3.

In this embodiment, prior to the operation S30 of determining a target input grayscale corresponding to a preset target brightness according to an actual Gamma curve value, the method further includes the following operations S01 to S03.

In S01, obtaining n reference images of the display panel at different input grayscales, wherein the n is an integer greater than or equal to 2.

In a specific implementation, after the display panel is lighted by the driving circuit, the initial display state (i.e., the current image) of the current display panel can be captured by the high-resolution CCD camera, and the CCD camera additionally captures the display state of the current display panel. As well as the image information of different grayscale values, and it is used as reference images. The nonuniform areas in the reference images are identical to the nonuniform areas of the initial display state (i.e., the current image).

Depending on the actual needs, an additional 5 or more reference images can be taken using the original CCD camera. For example, 5 reference images are taken, the 5 images were obtained by taking 5 different grayscale values of the picture in the current display panel, the first picture takes 0 grayscale, the fifth picture takes 255 grayscale, and the middle 3 pictures take 3 different grayscale values. In addition, increasing the number of images does not result in too much work and difficulty, is simple and easy.

In S02, calculating a reference Gamma curve value of each reference image.

In this embodiment, the middle 3 reference images mentioned above are detected to extract corresponding reference input grayscale values and reference output brightness, then calculating a reference Gamma curve value of each reference image according to the reference input grayscale, the reference output brightness, and a Gamma mathematical model. The Gamma mathematical model characterizing a correspondence relationship between the reference input grayscale and the reference output brightness.

It can be understood that the input grayscale value of each reference image (it can represent the Gamma voltage, that is, the objective physical quantity recognized by computer) and the output brightness value (i.e., the subjective brightness perception of the human eye) are nonlinear mapping relationship (i.e., the Gamma curve can reflect this mapping relationship between them, this mapping relationship can also be called Gamma mathematical model). The nonlinear mapping relationship usually uses the default formula to indicate: output brightness=(input grayscale)$^{Gamma}$, since the reference image is taken by a CCD camera, the output brightness value of each reference image can be measured, so that the output brightness value is also known. Therefore, the Gamma value of each reference image can be obtained by the formula output brightness=(input grayscale)$^{Gamma}$, wherein the Gamma values of the respective reference images are not necessarily the same. There will be some errors between them.

In a specific implementation, the Gamma mathematical model is:

$$\frac{Tx - To}{T255 - To} = \left(\frac{Lx}{255}\right)^{Gamma}$$

Where Tx is the reference output brightness, T255 is the corresponding output brightness when the input grayscale is 255, To is the corresponding output brightness when the input grayscale is 0, Lx is the reference input grayscale, and Gamma is the actual Gamma curve value.

The embodiment introduces the Gamma mathematical model such that the Gamma curve value of each reference picture obtained by calculation is closer to the actual Gamma curve value of the current display panel. The Gamma curve value of each reference image is calculated by the above formula, and the error between the calculated result and the actual Gamma curve value of the display panel can be further reduced.

In S03, taking the average value of the reference Gamma curve values as the actual Gamma curve value.

It can be understood from the above that, there is an error in the Gamma curve values of each reference image obtained by calculation, so by obtaining the Gamma curve corresponding to the average value of their Gamma curve values, one can obtain the Gamma curve most close to the actual condition of the panel. The Gamma curve is taken as the actual Gamma curve, and the actual Gamma curve is used as a reference to find the compensation value actually needed for each nonuniform block in current image of the display panel, achieving the most accurate compensation.

In this embodiment, the actual Gamma curve of the display panel is measured in advance, that is, by taking images of the display panel at different grayscales and combining with the Gamma mathematical model, to detect the reference Gamma curve value of the display panel at different grayscales. The average value of the reference Gamma curve value is taken as the actual Gamma curve value that is closest to the actual condition of the display panel. The actual Gamma curve of the display panel can be effectively obtained during the production of the display panel, thereby enabling more accurate acquisition of grayscale compensation value of the nonuniform area.

Figure 7:
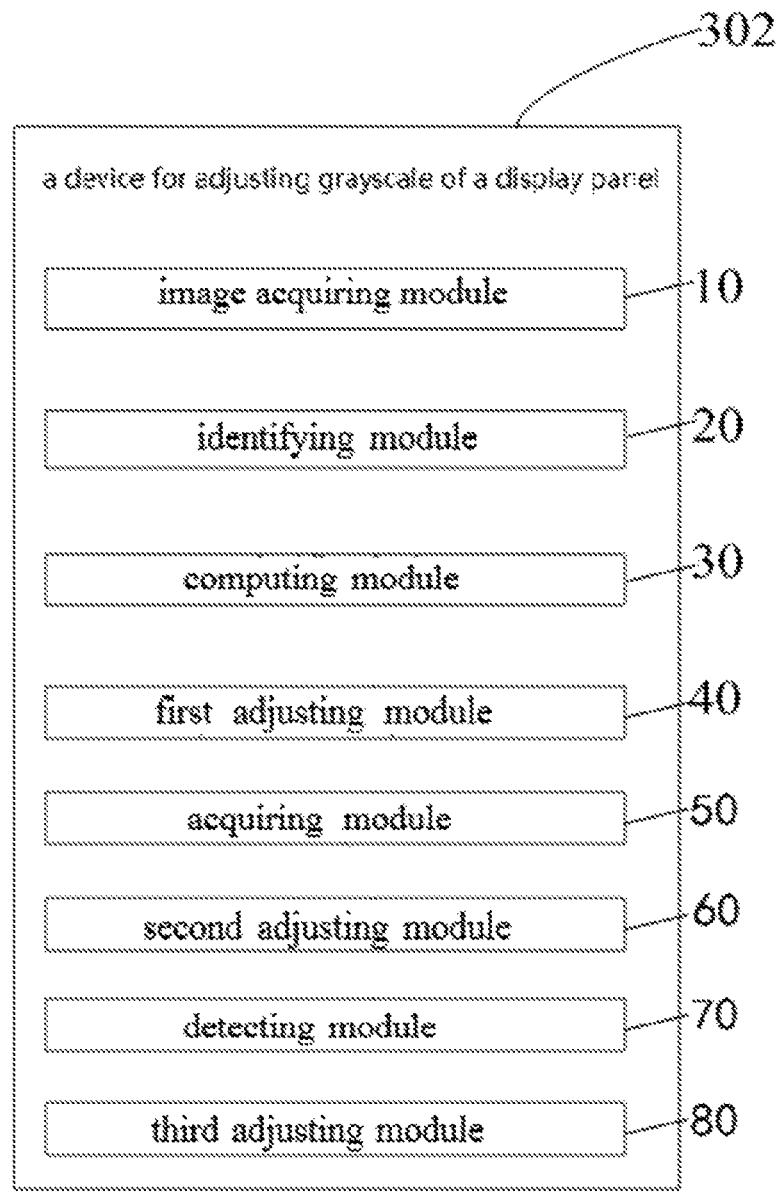
FIG. 7 is a schematic block diagram of a device for adjusting grayscale of a display panel in accordance with embodiments of this disclosure.

As illustrated in FIG. 7, it is a schematic block diagram of a device for adjusting grayscale of a display panel in accordance with embodiments of this disclosure, the display panel is a liquid crystal display panel including a common electrode and a pixel electrode, and the device for adjusting grayscale of display panel 302 includes the following parts.

The image acquiring module 10, being configured to obtain a current image by performing image acquisition of a display panel;

It can be understood that the current image is the current display image of the display panel.

In a specific implementation, after the display panel is illuminated, the current display image (i.e., the current image) can be captured by the optical CCD camera.

It should be noted that the display panel in this embodiment is applicable to a computer display screen, a television display screen, and a tablet display screen.

The identifying module 20, being configured to identify an nonuniform block in the current image, detect original output brightness and original input grayscale of the nonuniform block.

It can be understood that Mura may occur in the current display image displayed by the display panel during the process of producing the display panel (that is, there may be nonuniform blocks appearing). While the image is being collected on the display panel, extracting the luminance signal of the nonuniform blocks of the current image.

It should also be noted that the brightness signal includes an input gray level and an output brightness. The input grayscale can be recognized by the display, and the grayscale represents an actual objective brightness, that is, an objective natural physical quantity, and the display will continuously acquire different input voltages (also called Gamma voltages). The different input voltages reflects different grayscales. And the output brightness is subjective brightness perception of the human eye. Since the perception of human to stimuli is nonlinear, the outside world strengthens the stimuli in a certain proportion. For people, this stimuli is evenly increased. Similarly, the human eye is also nonlinear in perception of natural brightness. So the subjective brightness of the eye perception is not exactly the same as the actual objective brightness. The Gamma curve is used to coordinate the relationship between the subjective brightness perception of the human eye and the actual objective natural brightness, i.e., to coordinate the output brightness and input grayscale. The mapping relationship between the above two can be determined by the formula: output value=(input value)$^{Gamma}$.

It can be understood that the output brightness value of the initial display picture (i.e., the subjective brightness perception of the human eye) is known; the grayscale value of the initially displayed picture (i.e., the input grayscale) is also known, but the display screen is displayed nonuniform under this grayscale. That is, there is Mura occurs. When detecting the nonuniform block, some Mura is obvious, the human eye can see, some Mura is not visible to the human eye. The professional device detects and recognizes the nonuniform blocks in the current image, that is, the pixel distribution feature is analyzed according to the display data in the collected current image, and the Mura is identified according to the relevant algorithm. There are many related algorithms in the process of detecting Mura, so the embodiment is not limited herein.

The computing module 30, being configured to determine a target input grayscale corresponding to a preset target brightness according to an actual Gamma curve value, wherein the actual Gamma curve value is obtained by testing the display panel.

It should be noted that, in this embodiment, there is a uniform brightness display area in the current image, and the output brightness value of the display area is used as the preset target brightness value.

In the specific implementation, an output brightness of center point of the current image is obtained. The output brightness of center point of the current image is take as a preset target brightness. That is, the output brightness of the central area of the panel of the current image is obtained and used as a baseline, and the difference between the brightness of the other areas of the panel and the central area is compared. Usually, in the actual production of the display panel, the center point of the display panel is the best place for optical taste. Therefore, when debugging the panel, the center point of the panel is used as the reference.

Optionally, by obtaining the output brightness of each pixels in other areas than the nonuniform area in the current image, an average value of the output brightness of the pixels can be calculated, and the average value is used as a preset target brightness.

The first adjusting module 40, being configured to take a difference between the original input grayscale and the target input grayscale as a grayscale compensation value of the nonuniform block.

It can be understood that, referring to FIG. 4, it is assumed that the picture on the left side has a white nonuniform block W and a black nonuniform block B in the horizontal direction. The first adjusting module 40 use the difference between original (input) grayscale value and the target grayscale as the compensation data of the nonuniform block (i.e., the grayscale compensation value), and data compensation is performed on the two regions. That is, the display data of the block is the sum of the original display data and the compensation data. The compensation data of the white nonuniform block is negative, that is, the display data will be reduced; and the display data corresponding to the black nonuniform block will be increased accordingly. So that uniform brightness can be obtained finally, and Mura can be eliminated.

In the specific implementation, referring to FIG. 5, it is assumed that the measured actual Gamma curve value of panel is 2.4, the dotted line is the Gamma 2.4 curve, and the solid line is the Gamma 2.2 curve. It can be seen that when the same luminance difference L1 is compensated, the compensated grayscale value L3 obtained for the Gamma 2.2 curve is different from the compensated grayscale value L2 obtained under the Gamma 2.4 curve. That is, the compensated grayscale values obtained by different Gamma curves are different. The compensated grayscale value L3 of Gamma2.2 curve is smaller than the compensated grayscale value L2 of the actual Gamma 2.4 curve. So only compensation that meets the characteristics of the panel itself is optimal. Then the obtained grayscale compensation value may be burned into an Electrically Erasable Programmable Read Only Memory (EEPROM) to achieve a compensation effect of the current image. That is, transmitting the grayscale compensation value to the display panel, for the display panel adding the grayscale compensation value to the original input grayscale of the nonuniform block as a new input grayscale of the nonuniform block, to eliminate the nonuniform block (Mura phenomenon) in the current image.

The acquiring module 50, being configured to acquire a plurality of sampling grayscale voltages and a specific grayscale voltage in accordance with the actual Gamma curve when applying an initial common voltage to the common elect rode.

The second adjusting module 60, being configured to adjust the voltage applied to the common electrode, to acquire a common voltage by the acquiring module 50 at which a flicker value of a display screen is minimized when the specific grayscale voltage is applied to the pixel electrode, taking the common voltage as an actual common voltage.

The detecting module 70, being configured to determine a flicker value, wherein the detecting module 70 optionally include a linear camera, which can be a Charge-coupled Device (CCD) high-speed linear camera, and the CCD high-speed linear camera can obtain the minimum flicker value of the display screen.

The third adjusting module 80, being configured to respectively adjust at least one of the acquired sampling grayscale voltages when the actual common voltage is applied to the common electrode, determining a flicker value by detecting module 70 of the corresponding display screen and taking the grayscale voltage corresponding to the minimum flicker value of the display screen as the Gamma reference voltage corresponding to the grayscale.

It should be noted that each module in this embodiment may be a separately provided processor, or may be implemented in a processor integrated in the device, or may be stored in a memory in the form of program code, and processed by one processor to execute the functions of each of the above units.

Figure 8:
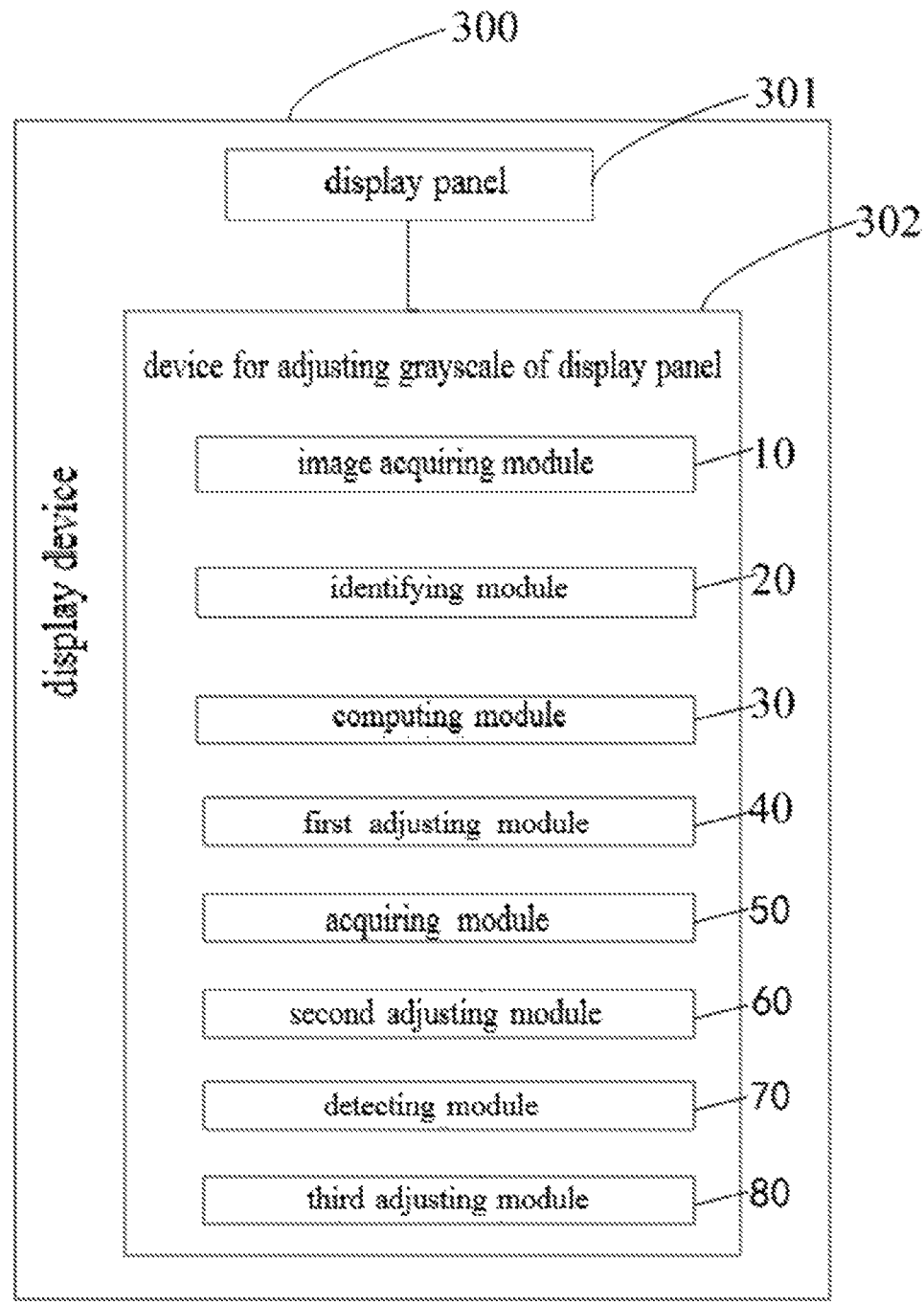
FIG. 8 is a schematic block diagram of a display device in accordance with embodiments of this disclosure.

As illustrated in FIG. 8, it is a schematic block diagram of a display device in accordance with embodiments of this disclosure. The display device 300 optionally include the display panel 301 and the device for adjusting grayscale of display panel 302. The device 302 includes the following parts.

The image acquiring module 10, being configured to obtain a current image by performing image acquisition of a display panel;

The identifying module 20, being configured to identify an nonuniform block in the current image, detect original output brightness and original input grayscale of the nonuniform block.

The computing module 30, being configured to determine a target input grayscale corresponding to a preset target brightness according to an actual Gamma curve value, wherein the actual Gamma curve value is obtained by testing the display panel.

The first adjusting module 40, being configured to take a difference between the original input grayscale and the target input grayscale as a grayscale compensation value of the nonuniform block.

The acquiring module 50, being configured to acquire a plurality of sampling grayscale voltages and a specific grayscale voltage in accordance with the actual Gamma curve when applying an initial common voltage to the common elect rode.

The second adjusting module 60, being configured to adjust the voltage applied to the common electrode, to acquire a common voltage by the acquiring module 50 at which a flicker value of a display screen is minimized when the specific grayscale voltage is applied to the pixel electrode, taking the common voltage as an actual common voltage.

The detecting module 70, being configured to determine a flicker value, wherein the detecting module 70 optionally include a linear camera, which can be a Charge-coupled Device (CCD) high-speed linear camera, and the CCD high-speed linear camera can obtain the minimum flicker value of the display screen.

The third adjusting module 80, being configured to respectively adjust at least one of the acquired sampling grayscale voltages when the actual common voltage is applied to the common electrode, determining a flicker value by detecting module 70 of the corresponding display screen and taking the grayscale voltage corresponding to the minimum flicker value of the display screen as the Gamma reference voltage corresponding to the grayscale.

It should be noted that the display panel in this embodiment is applicable to a computer display screen, a television display screen, and a tablet display screen.

In the process of manufacturing each liquid crystal panel, the grayscale value compensation is performed on the nonuniform block of the display panel according to the actual Gamma curve and the preset target brightness, thereby achieving the most accurate compensation result, and the Mura in display panel is eliminated accurately and effectively.

In addition, the embodiment of the present disclosure further provides a computer readable storage medium, storing the grayscale of the display panel adjusting program, the display panel is a liquid crystal display panel including a common electrode and a pixel electrode. When the grayscale of the display panel adjusting program is executed by the processor, the following operations are implemented:

obtaining a current image by performing image acquisition of a display panel;

identifying an nonuniform block in the current image, detecting original output brightness and original input grayscale of the nonuniform block;

determining a target input grayscale corresponding to a preset target brightness according to an actual Gamma curve value, wherein the actual Gamma curve value is obtained by testing the display panel;

taking a difference between the original input grayscale and the target input grayscale as a grayscale compensation value of the inhomogeneous block;

applying an initial common voltage to the common electrode, and acquiring a plurality of sampling grayscale voltages and a specific grayscale voltage in accordance with the actual Gamma curve;

adjusting the voltage applied to the common electrode, to determine a common voltage at which a flicker value of a display screen is minimized when the specific grayscale voltage is applied to the pixel electrode, taking the common voltage as an actual common voltage; and respectively adjusting at least one of the acquired sampling grayscale voltages when the actual common voltage is applied to the common electrode, determining a flicker value of the corresponding display screen, and taking the grayscale voltage corresponding to the minimum flicker value of the display screen as the Gamma reference voltage corresponding to the grayscale.

Further, when the grayscale of the display panel adjusting program is executed by the processor, the following operations are also implemented:

obtaining n reference images of the display panel at different input grayscales, wherein the n is an integer greater than or equal to 2;

calculating a reference Gamma curve value of each reference image; and taking the average value of the reference Gamma curve values as the actual Gamma curve value.

Further, when the grayscale of the display panel adjusting program is executed by the processor, the following operations are also implemented:

detecting a reference input grayscale and a reference output brightness of each reference image; and calculating a reference Gamma curve value of each reference image according to the reference input grayscale, the reference output brightness, and a Gamma mathematical model; wherein the Gamma mathematical model characterizing a correspondence relationship between the reference input grayscale and the reference output brightness.

Further, when the grayscale of the display panel adjusting program is executed by the processor, the following operations are also implemented:

obtaining an output brightness of center point of the current image, taking the output brightness of center point of the current image as a preset target brightness.

Further, when the grayscale of the display panel adjusting program is executed by the processor, the following operations are also implemented:

obtaining the output brightness of each pixel in areas other than the nonuniform block in the current image; and calculating an average value of the output brightness of the pixels, and is using the average value as a preset target brightness.

Further, when the grayscale of the display panel adjusting program is executed by the processor, the following operations are also implemented:

transmitting the grayscale compensation value to the display panel, for the display panel adding the grayscale compensation value to the original input grayscale of the nonuniform block as a new input grayscale of the nonuniform block, to eliminate the nonuniform block in the current image.

Further, the method includes that programming the grayscale compensation value into a memory to achieve a compensation effect of the current image.

Further, the liquid crystal display panel is applicable to a computer display screen, a television display screen, and a tablet display screen.

Further, the applying an initial common voltage to the common electrode, and acquiring a plurality of sampling grayscale voltages and a specific grayscale voltage in accordance with the actual Gamma curve includes: applying an initial common voltage to the common electrode, adjusting a voltage applied to the pixel electrode, acquiring a first sampling grayscale voltage corresponding to a maximum brightness value of the display screen and a second sampling grayscale voltage corresponding to a minimum brightness value of the display screen; obtaining an intermediate brightness value corresponding to a plurality of intermediate grayscales according to the maximum brightness value, the minimum brightness value, and the actual Gamma curve, wherein the intermediate grayscale is a grayscale between the maximum grayscale and the minimum grayscale; and adjusting the voltage applied to the pixel electrode to obtain sampling grayscale voltages corresponding to a plurality of intermediate brightness value.

Further, the specific grayscale voltage is a sampling grayscale voltage corresponding to a grayscale between the maximum grayscale and the minimum grayscale, which are corresponding grayscales to a plurality of sampling grayscale voltages.

Further, the operation of respectively adjusting at least one sampling grayscale voltages of the acquired plurality of sampling grayscale voltages is: adjusting all of the sampling grayscale voltages of the acquired plurality of sampling grayscale voltages respectively.

Further, the plurality of sampling grayscale voltages are 8 sampling grayscale voltages, or 9 sampling grayscale voltages, or 11 sampling grayscale voltages.

Further, in the case that the plurality of sampling grayscale voltages are 8 sampling grayscale voltages, the grayscales corresponding to the 8 sampling grayscale voltages are: grayscale 0, grayscale 1, grayscale 31, grayscale 63, grayscale 127, grayscale 191, grayscale 254, grayscale 255.

Further, the flicker value measurement frequency is equal to the video frame rate of the display screen.

Further, after determining all Gamma reference voltages, the method for debugging the flicker value further includes: measuring the afterimage-degree of the liquid crystal display panel by displaying a black and white grid screen for a certain period and switching the screen to a grayscale display screen.

In the embodiment, by capturing the display panel images at different grayscales, combining the Gamma mathematical model, the Gamma curve value of the display panel at different grayscales is detected, and the average value of the Gamma curve value is taken as the actual Gamma curve value closest to the actual condition of the display panel. The actual Gamma curve of the display panel can be effectively obtained during the production, thereby obtaining the grayscale compensation value of the nonuniform block more accurately. The problem that unsatisfied result of Demura technology caused by inaccurate grayscale compensation value of the nonuniform area of the display panel during the process of producing each liquid crystal panel can be solved by the technical solution of the embodiment of the present disclosure. At the same time, on the basis of ensuring the minimum flicker degree of the display screen corresponding to a specific grayscale voltage, at least one sampling grayscale voltage is asymmetrically adjusted to obtain a Gamma reference voltage corresponding to the minimum flicker value of the display screen, i.e., in the present disclosure, the flicker value of the display screen corresponding to a specific grayscale voltage and at least one Gamma reference voltage is minimized by actual adjustment, thereby reducing the probability that the display screen flickers when the liquid crystal display panel is displayed in full grayscale, and reducing the occurrence chance of afterimages.

Also need to explain that as used herein, the terms "including," "comprising," or any other variants thereof are intended to encompass a non-exclusive inclusion, so that processes, methods, articles, or systems that include a series of elements will include not only those elements, but also other elements as well that haven't been explicitly listed or those elements inherent in such processes, methods, articles, or systems. In the absence of further restrictions, the element defined by the phrase "including/comprising a . . . " will not preclude the existence of additional such elements in the processes, methods, articles, or systems that include the element.

The above numbering of embodiments is intended for illustrative purposes only, and is not indicative of the pros and cons of these embodiments.

By the above description of embodiments, it will be evident to those of skill art that the methods according to the above embodiments can be implemented by means of software plus the necessary general-purpose hardware platform; they can of course be implemented by hardware, but in many cases the former will be more advantageous. Based on such an understanding, the essential technical solution of the disclosure, or the portion that contributes to the prior art may be embodied as software products. Computer software products can be stored in a storage medium (e.g., a ROM/RAM, a magnetic disk, an optical disk) and may include multiple instructions that, when executed, can cause a computing device (e.g., a mobile phone, a computer, a server, a network device, etc.), to execute the methods as described in the various embodiments of the disclosure.

The foregoing description merely portrays some illustrative embodiments according to the disclosure and therefore is not intended to limit the patentable scope of the disclosure. Any equivalent structural or flow transformations that are made taking advantage of the specification and accompanying drawings of the disclosure and any direct or indirect applications thereof in other related technical fields shall all fall in the scope of protection of the disclosure.

What is claimed is:

1. A device for adjusting grayscale of display panel, wherein the display panel is a liquid crystal display panel including a common electrode and a pixel electrode, and the device comprises:
    an image acquiring module, being configured to obtain a current image by acquiring image from the display panel;
    an identifying module, being configured to identify an nonuniform block in the current image, and detect original output brightness and original input grayscale of the nonuniform block;
    a computing module, being configured to determine a target input grayscale corresponding to a preset target brightness according to an actual Gamma curve value, wherein the actual Gamma curve value is obtained by testing the display panel;
    a first adjusting module, being configured to take a difference between the original input grayscale and the target input grayscale as a grayscale compensation value of the nonuniform block;
    an acquiring module, being configured to acquire a plurality of sampling grayscale voltages and a specific grayscale voltage in accordance with an actual Gamma curve when applying an initial common voltage to the common electrode;
    a second adjusting module, being configured to adjust the voltage applied to the common electrode, to acquire a common voltage by the acquiring module at which a flicker value of a display screen is minimized when the specific grayscale voltage is applied to the pixel electrode, and take the common voltage as an actual common voltage;
    a detecting module, being configured to determine a flicker value; and
    a third adjusting module, being configured to respectively adjust at least one of the acquired sampling grayscale voltages when the actual common voltage is applied to the common electrode, and determine a flicker value by detecting module of the corresponding display screen and taking the specific grayscale voltage corresponding to the minimum flicker value of the display screen as a Gamma reference voltage corresponding to the target input grayscale.

2. The device of claim 1, wherein the image acquiring module is an optical CCD camera, and the detecting module further comprises a linear camera.

3. A display device, comprising:
    a display panel; and
    the device for adjusting grayscale of display panel, wherein the device comprises:
    an image acquiring module, being configured to obtain a current image by acquiring image from the display panel;

an identifying module, being configured to identify an nonuniform block in the current image, and detect original output brightness and original input grayscale of the nonuniform block;

a computing module, being configured to determine a target input grayscale corresponding to a preset target brightness according to an actual Gamma curve value, wherein the actual Gamma curve value is obtained by testing the display panel;

a first adjusting module, being configured to take a difference between the original input grayscale and the target input grayscale as a grayscale compensation value of the nonuniform block;

an acquiring module, being configured to acquire a plurality of sampling grayscale voltages and a specific grayscale voltage in accordance with an actual Gamma curve when applying an initial common voltage to the common electrode;

a second adjusting module, being configured to adjust the voltage applied to the common electrode, to acquire a common voltage by the acquiring module at which a flicker value of a display screen is minimized when the specific grayscale voltage is applied to the pixel electrode, and take the common voltage as an actual common voltage;

a detecting module, being configured to determine a flicker value; and a third adjusting module, being configured to respectively adjust at least one of the acquired sampling grayscale voltages when the actual common voltage is applied to the common electrode, and determine a flicker value by detecting module of the corresponding display screen and taking the specific grayscale voltage corresponding to the minimum flicker value of the display screen as a Gamma reference voltage corresponding to the target input grayscale.

4. A method for adjusting grayscale of display panel, wherein the display panel is a liquid crystal display panel comprising a common electrode and a pixel electrode, the method comprises:

obtaining a current image by acquiring image from the display panel;

identifying a nonuniform block in the current image, and detecting original output brightness and original input grayscale of the nonuniform block;

determining a target input grayscale corresponding to a preset target brightness according to an actual Gamma curve value, wherein the actual Gamma curve value is obtained by testing the display panel;

taking a difference between the original input grayscale and the target input grayscale as a grayscale compensation value of the nonuniform block;

applying an initial common voltage to the common electrode, and acquiring a plurality of sampling grayscale voltages and a specific grayscale voltage in accordance with an actual Gamma curve;

adjusting the voltage applied to the common electrode, to acquire a common voltage at which a flicker value of a display screen is minimized when the specific grayscale voltage is applied to the pixel electrode, taking the common voltage as an actual common voltage; and respectively adjusting at least one of the acquired sampling grayscale voltages when the actual common voltage is applied to the common electrode, determining a flicker value of the corresponding display screen, and taking the specific grayscale voltage corresponding to the minimum flicker value of the display screen as a Gamma reference voltage corresponding to the target input grayscale.

5. The method of claim 4, wherein further comprises, prior to the operation of determining a target input grayscale corresponding to a preset target brightness according to an actual Gamma curve value:

obtaining n reference images of the display panel at different input grayscales, wherein the n is an integer greater than or equal to 2;

calculating a reference Gamma curve value of each reference image; and taking an average value of the reference Gamma curve value as the actual Gamma curve value.

6. The method of claim 5, wherein the operation of calculating a reference Gamma curve value of each reference image comprises:

detecting a reference input grayscale and a reference output brightness of each reference image; and calculating a reference Gamma curve value of each reference image according to the reference input grayscale, the reference output brightness, and a Gamma mathematical model; the Gamma mathematical model characterizing a correspondence relationship between the reference input grayscale and the reference output brightness.

7. The method of claim 6, wherein the Gamma mathematical model is:

$$\frac{Tx - To}{T255 - To} = \left(\frac{Lx}{255}\right)^{Gamma}$$

Where Tx is the reference output brightness, T255 is the corresponding output brightness when the input grayscale is 255, To is the corresponding output brightness when the input grayscale is 0, Lx is the reference input grayscale, and Gamma is the actual Gamma curve value.

8. The method of claim 5, wherein the n is an integer greater than or equal to 5.

9. The method of claim 4, wherein further comprises, prior to the operation of determining a target input grayscale corresponding to a preset target brightness according to an actual Gamma curve value:

obtaining an output brightness of center point of the current image, taking the output brightness of center point of the current image as a preset target brightness.

10. The method of claim 4, wherein further comprises, prior to the operation of determining a target input grayscale corresponding to a preset target brightness according to an actual Gamma curve value:

obtaining the output brightness of each pixel in areas other than the nonuniform block in the current image; and taking an average value of the acquired output brightness as the preset target brightness.

11. The method of claim 4, wherein further comprises, subsequent to the operation of taking a difference between the original input grayscale and the target input grayscale as a grayscale compensation value of the nonuniform block:

transmitting the grayscale compensation value to the display panel, allowing the display panel to take the grayscale of adding the grayscale compensation value to the original input grayscale of the nonuniform block as a new input grayscale of the nonuniform block, to eliminate the nonuniform block in the current image.

12. The method of claim 4, further comprising that recording the grayscale compensation value into a memory to achieve a compensation effect for the current image.

13. The method of claim 4, wherein the liquid crystal display panel is applicable to a computer display screen, a television display screen, and a tablet computer display screen.

14. The method of claim 4, wherein the operation of applying an initial common voltage to the common electrode, and acquiring a plurality of sampling grayscale voltages and a specific grayscale voltage in accordance with an actual Gamma curve comprises:
    applying an initial common voltage to the common electrode, adjusting a voltage applied to the pixel electrode, and acquiring a first sampling grayscale voltage corresponding to a maximum brightness value of the display screen and a second sampling grayscale voltage corresponding to a minimum brightness value of the display screen;
    obtaining a plurality of intermediate brightness values corresponding to a plurality of intermediate grayscales according to the maximum brightness value, the minimum brightness value, and the actual Gamma curve, wherein the intermediate grayscale is a grayscale between the maximum grayscale and the minimum grayscale; and
    adjusting the voltage applied to the pixel electrode to obtain a plurality of sampling grayscale voltages corresponding to the plurality of intermediate brightness values.

15. The method of claim 4, wherein the specific grayscale voltage is a sampling grayscale voltage corresponding to a grayscale between the maximum grayscale and the minimum grayscale, the grayscale is one of grayscales which are corresponding to the plurality of sampling grayscale voltages.

16. The method of claim 4, wherein the operation of respectively adjusting at least one of the acquired sampling grayscale voltages is:
    adjusting all of the sampling grayscale voltages of the acquired plurality of sampling grayscale voltages respectively.

17. The method of claim 4, wherein the plurality of sampling grayscale voltages comprise eight sampling grayscale voltages, or nine sampling grayscale voltages, or eleven sampling grayscale voltages.

18. The method of claim 17, wherein in the case that the plurality of sampling grayscale voltages comprise eight sampling grayscale voltages, the grayscales corresponding to the eight sampling grayscale voltages are: grayscale 0, grayscale 1, grayscale 31, grayscale 63, grayscale 127, grayscale 191, grayscale 254, and grayscale 255.

19. The method of claim 4, wherein the flicker value measurement frequency is equal to the video frame rate of the display screen.

20. The method of claim 4, further comprising, subsequent to the operation of determining the Gamma reference voltage:
    measuring the afterimage-degree of the liquid crystal display panel, by switching a black and white grid screen which have being displayed for a certain period to a grayscale display screen.

* * * * *